(12) United States Patent
Wüest

(10) Patent No.: US 7,765,874 B2
(45) Date of Patent: Aug. 3, 2010

(54) VACUUM MEASURING CELL WITH MEMBRANE

(75) Inventor: Martin Wüest, Malans (CH)

(73) Assignee: Inficon GmbH, Bad Ragaz (CH)

( * ) Notice: Subject to any disclaimer, the term of this patent is extended or adjusted under 35 U.S.C. 154(b) by 0 days.

(21) Appl. No.: 12/097,830

(22) PCT Filed: Nov. 23, 2006

(86) PCT No.: PCT/CH2006/000656

§ 371 (c)(1),
(2), (4) Date: Jun. 17, 2008

(87) PCT Pub. No.: WO2007/082395

PCT Pub. Date: Jul. 26, 2007

(65) Prior Publication Data

US 2008/0307890 A1    Dec. 18, 2008

(30) Foreign Application Priority Data

Jan. 18, 2006    (CH) .......................................... 69/06

(51) Int. Cl.
*G01L 7/08* (2006.01)

(52) U.S. Cl. ....................................................... 73/715

(58) Field of Classification Search ................... 73/715, 73/718, 724
See application file for complete search history.

(56) References Cited

U.S. PATENT DOCUMENTS

| | | | |
|---|---|---|---|
| 6,591,687 B1 * | 7/2003 | Bjoerkman et al. | ........... 73/724 |
| 7,107,855 B2 * | 9/2006 | Bjoerkman | ................... 73/724 |
| 7,140,085 B2 * | 11/2006 | Bjoerkman et al. | ........ 29/25.42 |
| 7,536,915 B2 * | 5/2009 | Strietzel et al. | ................ 73/718 |
| 2003/0118802 A1 * | 6/2003 | Bjoerkman | .................. 428/220 |
| 2008/0110269 A1 * | 5/2008 | Strietzel et al. | ................ 73/718 |

FOREIGN PATENT DOCUMENTS

| | | | |
|---|---|---|---|
| JP | 2009008693 A | * | 1/2009 |
| WO | WO 2007082395 A1 | * | 7/2007 |
| WO | WO 2008122134 A1 | * | 10/2008 |

* cited by examiner

*Primary Examiner*—Andre J Allen
(74) *Attorney, Agent, or Firm*—Notaro, Michalos & Zaccaria P.C.

(57) ABSTRACT

A vacuum measuring cell with a membrane between two planar housing parts has a first housing part forming a reference vacuum volume and the second housing part forming a measuring vacuum volume with a connection for the medium to be measured and a mechanism for measuring the membrane deflection. The membrane surface exposed to the medium to be measured is a structured surface.

11 Claims, 2 Drawing Sheets

VACUUM MEASURING CELL WITH MEMBRANE

FIELD AND BACKGROUND OF THE INVENTION

The invention relates to a vacuum measuring cell with membrane.

Total vacuum measuring cells are utilized for measuring the total pressure in vacuum chambers. The vacuum measuring cells are employed in monitoring various vacuum processes. Typical vacuum processes are here surface working processes, such as for example coating methods and etching methods. Such methods operate, for example, in pressure ranges of $10^{-5}$ mbar to 100 mbar. It is customary to measure such pressure ranges with so-called Pirani vacuum measuring cells or with so-called membrane vacuum measuring cells. One problem encountered herein is that the process gas, however also residual gas components, can contaminate the vacuum sensor during the process. As a consequence, imprecise or erroneous measurements or pressure indications can herein be generated. The vacuum measuring cells exhibit drift behavior commensurate with the time during which they are exposed to the process, which cannot always be eliminated or restored again by cleaning the vacuum cell or its surroundings. Membrane measuring cells are especially sensitive with respect to possible contaminations. In such membrane measuring cells a thin membrane is deflected as a function of the obtaining pressure which is to be measured. The deflection of this membrane is measured and serves as the measurement for the vacuum pressure to be measured. In the case of capacitive membrane measuring cells the deflection of the membrane is measured via the variation of the capacity between membrane and the solid body. In optical membrane measuring cells this deflection is acquired using optical methods, for example with interferometric methods. In order to be able to measure such pressure ranges with high sensitivity, the membranes must herein be implemented such that they are very thin, for example in the range of 40 to 760 µm. Contaminations of this thin membrane, for example by gas and/or particles, whereby even an accumulation layer can form, can lead to tension and/or compression stresses on the membrane, which additionally affects the deformation of the membrane and, as a consequence, leads to error measurements, for example in the absolute values to be measured, or to undesirable drift behavior over time. In addition, herein the resolution, and therewith the precision, of the measuring cell is decreased and, on the other hand, the reproducibility of the measuring results is not ensured.

In order to decrease such contaminations, until now a planar screen, technically also referred to as a baffle, has been utilized as is shown by example of a capacitive membrane vacuum measuring cell in FIG. 1. The vacuum measuring cell 15 is comprised of a first planar and round housing part 1 and a second planar and round housing part 4, wherein between these two housing parts a membrane 2 is connected with the formation of sealing via seals 3, for example a glass solder, such that between the membrane and each of the two housing parts one hollow volume 9, 10 is formed. The one hollow volume forms a reference vacuum volume 10 which communicates with a getter volume 12 via a connection line 13. In the getter volume 12 is located a getter 11 for the reliable maintenance of a reference vacuum. Opposite the reference vacuum volume 10 on the other side of membrane 2 the measuring vacuum volume 9 is formed which communicates via an outlet opening 16 with the baffle housing 6 in which a baffle 7 is located, the baffle housing being appropriately connected with the vacuum measuring cell 15 via, for example, a connection fitting 5. On the baffle housing 6 is disposed a connection flange 8 with a connection opening 22 which can be connected with the vacuum process chamber to be measured. The connection opening 22 is disposed such that the baffle 7 prevents the direct line-of-sight with respect to the outlet opening 16 of the vacuum measuring cell: herewith the baffle 7 is intended to unfold its protective effect thereby that the undesirable gases or particles are condensed on the baffle surface such that they do not reach the vacuum measuring cell. In the technical literature this baffle is often also referred to as a plasma shield. In processes containing reactive gases such are preferably intended to condense on the baffle. Hereby the sensor drift is to be reduced and thereby the service life of the measuring cell is to be increased. Although this planar baffle improves the service life of the measuring cell, it cannot be prevented that there is still a significant fraction of particles around the baffle, for example also enhanced through scattering processes, reaching the measuring membrane and here falsify the measurement.

SUMMARY OF THE INVENTION

The present invention addresses the problem of eliminating the disadvantages of prior art. The present invention in particular addresses the problem of realizing a membrane vacuum measuring cell which is non-sensitive with respect to contamination of the vacuum measuring cell, in particular of the membrane, in order to increase thereby the service life of the measuring cell significantly while ensuring the high measuring accuracy and reproducibility of the vacuum measurement. The membrane measuring cell should, in addition, be economical of production.

The problem in the vacuum measuring cell with membrane according to the genus is solved according to the invention of the independent claim or claims. The dependent patent claims refer to advantageous further embodiments of the invention.

The measuring cell according to the invention includes a membrane disposed between two planar housing parts, wherein the first housing part includes a reference vacuum volume and the second housing part a measuring vacuum volume with connection means for the connection with the medium to be measured and that means are provided for measuring the membrane deflection. On the side of the membrane surface facing the medium to be measured the membrane surface includes structures, whereby warpings of the membrane are reduced or prevented even if the measuring cell is exposed over a relatively long time to a medium which is highly contaminating. Thereby the use of such media is at best only made possible or the service life of the measuring is significantly extended while maintaining the requisite measuring accuracy.

The structuring can be formed in the simplest case as a step-form line pattern which ensures that accumulation layers are continuously divided into smaller zones, be that through thinned separating lines or preferably through interruptions such that a division in terms of warping effect over the membrane face occurs. The configuration of the structure can be in the form of a grid with periodic and/or nonperiodic intervals or it can be concentrically arranged or be divided into other subregions.

The structuring can advantageously also include overhanging steps such that the edge in the front region causes a type of shadowing and the base of the step, at least in the edge region, is only slightly coated or not at all by the accumulations and thereby the stress-generating layer is interrupted or the stress is at least diminished.

It is furthermore advantageous if the structures are markedly overhanging such that they have in cross section a table-like or mushroom-like shape. With advantage more than one such structure can be disposed one above the other such that a direct line-of-sight from the front side onto the base of the membrane in the openings in the structure is avoided. Through this type of labyrinth formation it is possible to avoid to a high degree that the contamination reaches the base of the membrane and this can be avoided even under particle scattering wherein a reliable interruption of the accumulation layer, and consequently of the stress buildup, is avoided.

The height of the structures should be such that corresponding to the thickness of the accumulation layer to be expected, thus approximately in the range of 0.1 μm to 10 μm, preferably of 0.1 μm to 5.0 μm, a reliable interruption of the accumulation layer is attained. The width of the structures should be small enough in order to be able to interrupt the stresses sufficiently also. These are advantageous if they are in the range of the twofold to the twentyfold of the structure thickness.

The material of the structures is advantageously chosen to be the same as that of the membrane. In the especially preferred application for capacitive and/or optical vacuum measuring cells, these comprise at least substantially $Al_2O_3$ and/or sapphire or they consist entirely of at least one of these materials.

Such structures can be generated through chemical etching processes and/or preferably through vacuum processes, such as in particular through vacuum plasma processes, such as sputter etching or, in particular, plasma-chemical etching (also referred to as reactive etching). Lifting techniques, such as the so-called lift-off process, long familiar in the semiconductor industry, can also be utilized. The structures can be introduced directly into the membrane and/or also into a previously applied thin layer.

In the table-shaped configurations with high overhang and especially in the structures disposed multiply one above the other, these can be produced by carrying out stepwise coating and subsequent etching of the desired structure elements. When employing vacuum processes, the coating steps as well as also the etching steps can be generated in the same vacuum installation.

Especially favorable results for the vacuum measuring cell are attained if a membrane provided in this manner with structures is utilized in combination with a baffle arrangement disposed between the measuring vacuum volume of the measuring cell, thus the membrane, and the medium to be measured. The baffle can here be a planar baffle according to prior art, such as described above. An even more suitable baffle is the helical baffle or the screw baffle, such as will be described in the following.

The screw baffle or helical baffle is disposed in a pipe piece between the sensor and the flange to the vacuum process chamber. This baffle can also be inserted in addition to known baffles, such as previously described. The screw baffle can moreover have several paths in order to increase the shielding effect additionally. Through the screw-form formation of the baffle a direct line-of-sight from the connection opening to the vacuum measuring cell is avoided with certainty whereby the particulates and/or also the particles are forced to interact multiply with the surface before they can reach the end of the baffle. It is of advantage if the baffle is implemented such that it can readily be removed for cleaning or for an exchange of the same. For this purpose advantageously holding elements, for example resilient elements, can be provided on the baffle itself and/or also on the pipe-form housing in order to be able to retain the baffle in position. It is advantageous to fabricate the baffle and/or the housing of a material which is compatible with the process in order to ensure a sufficiently long service life and to avoid additional contaminations through possible decompositions. Reactive processes, in particular reactive plasma processes, often comprise aggressive gases and behave correspondingly reactively, also with respect to the utilized materials of the structural parts employed. The structural parts, such as baffle and/or housing, exposed here can for this purpose also be coated with suitable resistant materials.

The various features of novelty which characterize the invention are pointed out with particularity in the claims annexed to and forming a part of this disclosure and are entirely based on the priority applications PCT/CH2006/000656 filed 23 Nov. 2006 which designated the US and is incorporated here by reference, and Swiss Application No. 69/06 filed 18 Jan. 2006.

BRIEF DESCRIPTION OF THE DRAWINGS

In the following the invention will be described schematically and by example in conjunction with Figures. In the drawing depict.

DESCRIPTION OF THE PREFERRED EMBODIMENTS

Several examples of structured membrane surfaces for vacuum measuring cells according to the invention are described by example in FIGS. 3a to 3e. Each of the Figures shows a segment of a membrane 41 in cross section. The membrane is preferably substantially comprised of a ceramic, such as $Al_2O_3$, and/or of sapphire, such as monocrystalline $Al_2O_3$. When utilized in capacitive vacuum measuring cells, one surface of the membrane 41 is coated in known manner with an electrically conducting coating on the side facing the medium to be measured, which coating forms the one electrode of a capacitor system. Depending on the pressure applied on the membrane, the membrane 41 is deformed correspondingly and the spacing of the electrodes of the capacitor is changed, and consequently its capacitance, which is measured and evaluated and which forms a signal which is correlated with the pressure magnitude to be measured. In the optical membrane vacuum measuring cell the deflection of the membrane is measured optically, for example via a Fabry-Perot system. If the membrane 41 is contaminated on the media side, a type of accumulation layer 40 can condense on the membrane surface 41a and this accumulation layer 40 generates undesired stresses due to its material properties which, compared to the membrane 41, are different, which stresses lead to a deformation of the membrane 41 as is shown schematically in FIG. 3a. Due to the undesired warping of the membrane, this deformation of the membrane 41 leads to falsification of the measurement result and limits the accuracy of the measurement and in particular the time usability or the service life of the measuring cell. This problem is all the more important since the membrane measuring cells, of the previously described type with ceramic membranes or sapphire membranes, are employed in particular in contamination-critical processes, such as for example in plasma processes, in particular in reactive and chemically reactive processes.

Figure 3A:
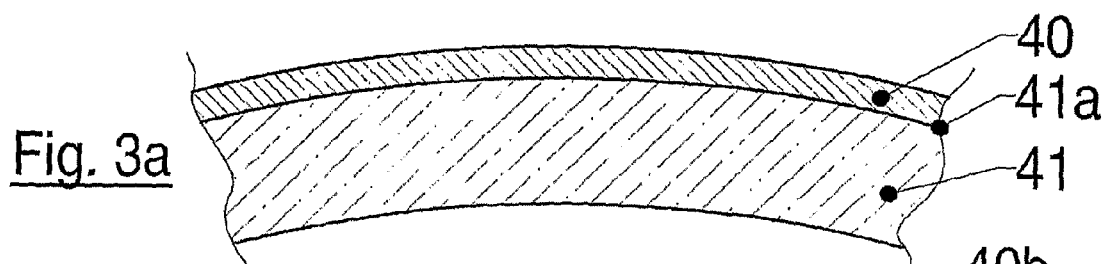
Figure 3B:
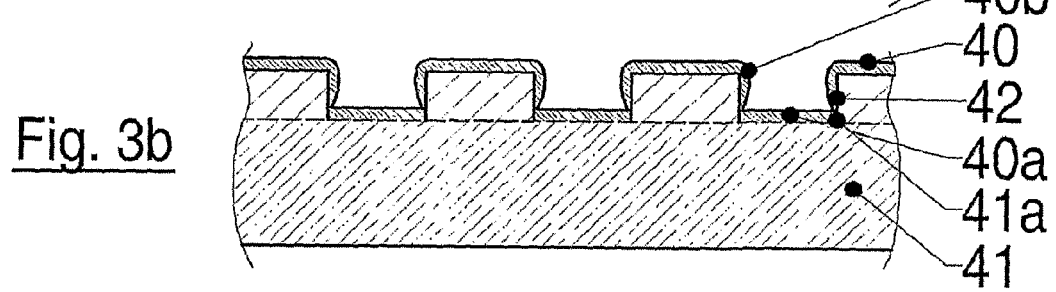

To avoid such undesirable stresses in the membrane 41, the invention proposes structuring the membrane surface 41a such that stresses generated by an accumulation layer 40 on the membrane 41 are divided or interrupted, and thereby are overall strongly reduced and that the membrane 41 is additionally less curved through the accumulation layer 40. A simple step-form structuring is depicted in FIG. 3b. The surface of the membrane is here provided as an example with linear indentations, a type of grating, whereby the accumulation layer 40 over the side covering 40b of the step wall, depending on the accumulation conditions, becomes more or less thinner or can even be interrupted at the base of the indentation in the edge region. The base covering 40a of the accumulation layer in the most favorable case subsequently no longer forms a coating of the membrane contiguous with the upper covering. Such structures can with advantage be installed in the form of a grid. They can be worked directly out of the membrane material, for example by plasma etching or chemical etching or also with the aid of lift-off processes, such as are known per se. However, the structures can also be generated thereby that an additional layer is applied onto the original membrane surface 41a and this membrane surface is subsequently structured. The layer material should in this case be preferably similar or identical to the membrane material and should itself not generate additional stresses. The thickness or height of the structure should be greater than the thickness of the accumulation layer 40 to be expected. Favorable values are in the range of 0.1 μm to 20 μm or even in the range of 0.1 μm to 10 μm. The membrane thicknesses utilized in such measuring cells are in the range of 40 μm to 760 μm at a membrane diameter of preferably 5 to 80 mm. In order to be able to dissipate the stresses adequately, the accumulation layer must be divided or thinned sufficiently often over the membrane surface. In practice favorable results are attained if the division is in a range which is within the twofold to twentyfold of the structure thickness.

Figure 3C:
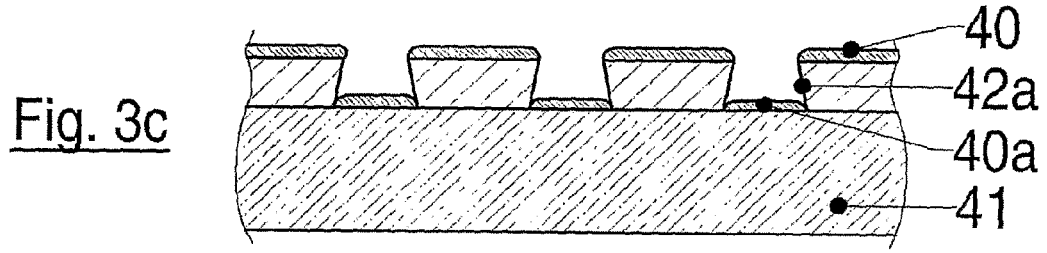

A further improved implementation of a structured membrane surface is shown in FIG. 3c. In contrast to the perpendicular steps according to FIG. 3b, the steps 42 of the indentations are here formed as overhanging steps 42a, whereby an even better effect with respect to the desired stress division of the accumulation layer 40, 40a is generated. Such overhanging steps can be generated using known etching processes through selective underetching.

Figure 3D:
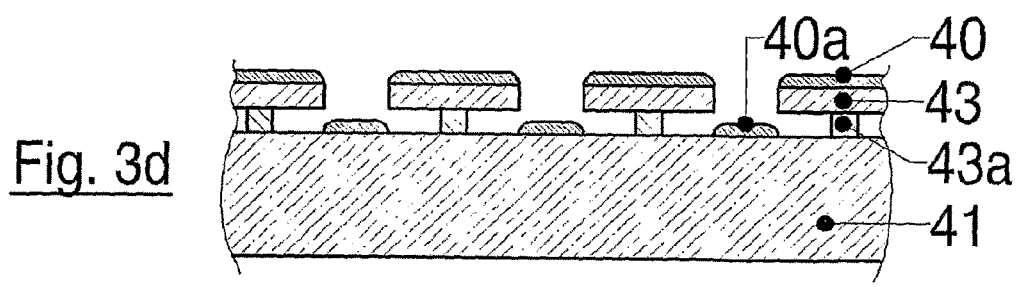
Figure 3E:
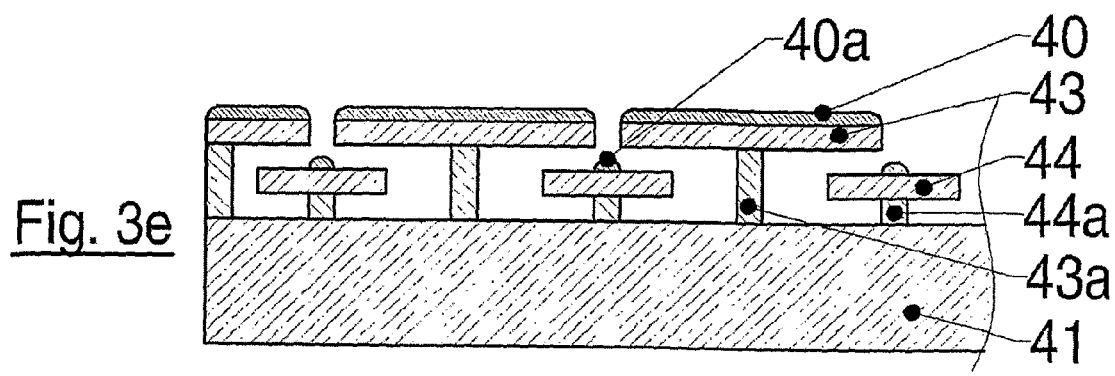

A continuation of the previously described overhanging structure leads to a structuring with table-form cross section such as is depicted in FIG. 3d. On a far protruding table 43 the accumulation layer 40 is deposited and through the prominent protrusion in the opening region between the tables 43 in the gap region onto the membrane surface 41a the accumulation layer is deposited as interrupted base covering. The table plate 43 rests on a relatively narrow table foot 43a, which can be eccentrically or centrally below the table plate 43 and ensures that the overhang of the table plate is sufficiently large to interrupt the accumulation layer with as much certainty as possible through shadowing. To be even more certain, additional table-like structures 44 with the foot 44a can be placed over the first table-like structure in order to attain an even more certain shadowing effect and, consequently, the interruption of the accumulation layer 40 through a labyrinth-like structure, according to FIG. 3e. Such structures can no longer be attained directly through single etching steps but must be realized through several and different coating and etching processes.

In an example with structuring according to FIG. 3c with strongly overhanging steps 42a an accumulation layer 40 with a layer thickness of 100 nm on the front side of the structure was measured, wherein the accumulation layer 40 was primarily comprised of silicon. The structuring was generated by plasma etching on an aluminum oxide membrane with a diameter of 19 mm. The membrane thickness was 400 μm. The depth of the etched structure was approximately 20 μm and the spacings of the grid-like grating or the discrete structures were approximately 40 μm and the width of the etched-in structure was approximately 30 μm. In a table-like structure this corresponds approximately to a table width of 30 μm at a table plate thickness of approximately 10 μm also at a table height of 10 μm and a table foot width of approximately 10 μm.

Without grid structure, through the accumulation layer 40a mechanical stress of approximately 1 GPa was generated and the membrane was hereby deformed by 3.5 μm. Due to the structuring the deformation could be decreased by a factor of 7, thus approximately to 0.5 μm. This corresponds to a measuring error of 14% at a measured pressure of 13 mbar. As the previously described example shows, through the procedure according to the invention the measuring accuracy or the service life of the membrane vacuum measuring cell can be drastically extended. It is advantageous if the width or the spacings of the structure elements are disposed in a main grating of the structured membrane surface which are in the range of 10 μm to 50 μm. If a table structure 43 is utilized, table plate thicknesses of 1 to 3 μm are especially suitable, wherein the table foot width is up to one third smaller than the table plate diameter, which itself is chosen to be a few μm less than the grating distance. However, the gap width between the structures should be chosen at least greater than the thickness to be expected or permitted of the accumulation layer. Through the procedure according to the invention the drift behavior of a membrane vacuum measuring cell can be decreased by up to a factor of ten.

Figure 1:
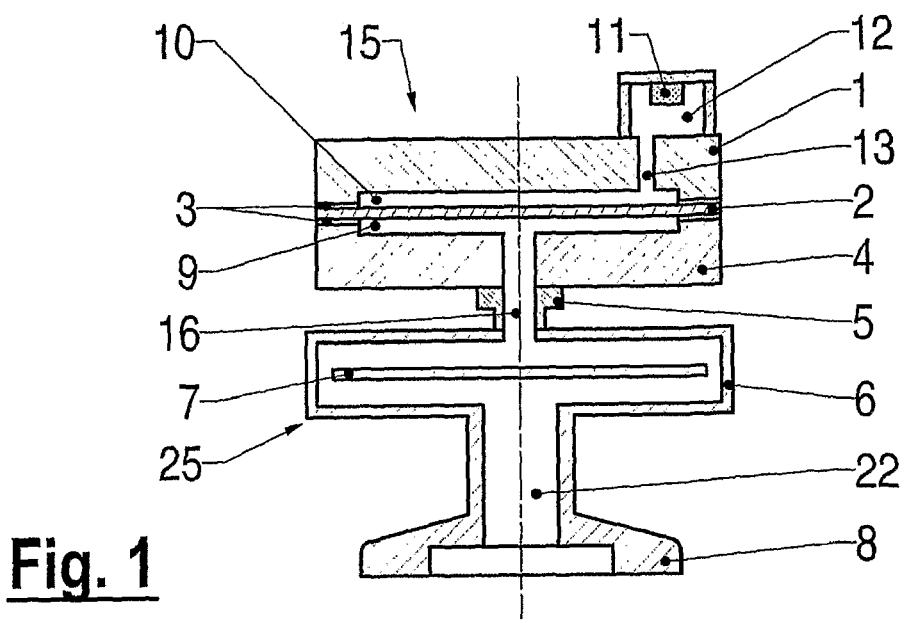
FIG. 1 schematically and in cross section a membrane vacuum measuring cell with a planar baffle, FIG. 2 schematically and in cross section a membrane vacuum measuring cell with a screw baffle, FIG. 3a in cross section a segment of a deformed membrane with accumulation layer, FIG. 3b in cross section a segment of a membrane with step-form structures on its surface according to the invention, FIG. 3c as FIG. 3b, however with overhanging steps of the structure, FIG. 3d in cross section a segment of a membrane with table-form structures on its surface according to the invention, FIG. 3e in cross section a segment of a membrane with two table-form structures, disposed interleaved one above the other, on its surface according to the invention.
Figure 2:
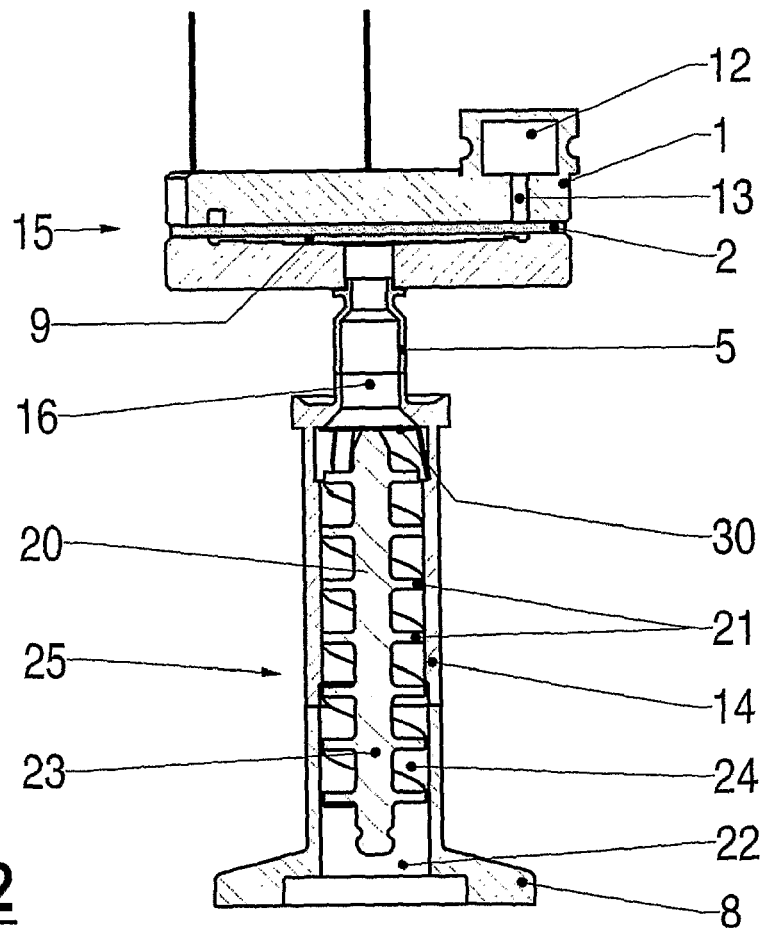

FIG. 2 shows a vacuum measuring cell arrangement in cross section, with a membrane vacuum measuring cell 15 and a baffle arrangement 25 disposed thereon with a screw baffle 20 implemented as a spiral-form baffle or as a helical baffle and which is especially suitable to be utilized in combination with the structured membrane. The vacuum measuring cell 15 is comprised of a first planar round housing part 1 and a second round planar housing part 4, wherein between them a membrane 2 is disposed under sealing at the periphery. The membrane 2 is disposed opposite to the first housing part 1 at such slight a spacing that between them a reference vacuum volume is formed, which, via a connection line 13, communicates with a getter volume 12 for the maintenance of a reference vacuum. On the opposite membrane side between membrane 2 and the second housing part 4 is formed a measuring vacuum volume 9, which preferably in the center through the second housing part 4 communicates via an opening and a connection fitting 5 with the baffle arrangement 25, which, in turn, includes a connection opening 22 which can be connected such that it communicates with the vacuum volume to be measured. The screw baffle 20 is herein disposed within a pipe piece 14 such that the windings 21 of the screw baffle 20 are so in contact on the inside wall of the pipe piece 14 that in this mesh region of the windings 21 at least a hindrance for the throughflow of particles is formed, however, preferably as much as possible a sealing in the pressure ranges preferably to be measured.

The windings 21 of the screw baffle 20 are formed such that a spiral-form path 24 is generated which, in comparison to the cross section of the screw material, allows for the formation of as large as possible a cross section of a free path 24 in order to attain a sufficiently high conductance. The windings 21 of the screw baffle 20 are therefore preferably implemented as prevalently planar screw baffle 20, which consequently represents a type of sheet-form spiral. To maintain the cross section of the path 24 as large as possible with respect to the solid material, the core 23 can be implemented with as small a diameter as possible or it can be omitted entirely. However, it is of advantage if the core has a certain diameter in the range of, for example, 2 to 6 mm in order to lend the spiral-form screw baffle 20 an appropriate stability and, in particular, also in order to be able to utilize the ends as holding means, on the one hand, for mounting the baffle within the pipe in position and, on the other hand, in order to form on the other side a type of handle which facilitates pulling the baffle simply out of the pipe if it is to be exchanged for purposes of cleaning.

The one side of the pipe piece 14 forms the outlet opening 16 of baffle arrangement 25 and is connected such that it communicates with the measuring vacuum volume 9 of the vacuum measuring cell 15. The other side of the pipe piece 14 forms the connection opening 22 for the vacuum volume to be measured and can advantageously have directly a connection flange 8 or be implemented as a connection flange 8. The connection flange 8 can herein preferably be implemented as a so-called small flange part as are conventionally utilized in the dimensions in the vacuum technique in order to be able to establish various pipe connections in simple manner. Herein are in particular utilized with advantage the flanges of type CF, KF and VCR known in vacuum technique.

Viewed in the axial longitudinal direction from the connection opening 22 in the direction of the outlet opening 16 of the baffle arrangement 25, no line-of-sight should be permitted, thus should be optically dense. The screw baffle 20 should herein have at least 1.5 windings 21. It is, however, advantageous if the screw baffle 20 is implemented as a multiple-threaded screw and includes several windings 21, for example 3 to 10 windings. It is in many cases sufficient if the pipe piece 14 and/or the baffle 20 is comprised of an Inox material. Under conditions highly difficult to measure, where highly active and aggressive process gases are utilized, it is in particular of advantage in the baffle arrangement 25 if the baffle 20 and/or the pipe piece 14 is fabricated of a material which as well as possible can withstand the aggressive process conditions and contaminations are not additionally produced through decomposition. To lower costs and to attain specific material properties more simply, the exposed surfaces of the pipe piece 14 and/or of the baffle 20 can also be coated with the appropriate protective materials. It can also be of advantage in certain cases if these materials are matched to the type of material of the membrane 2 of the vacuum measuring cell 15.

The screw baffle 20 permits in various and manifold manner additional optimization of the protective properties for the membrane 2 of the vacuum measuring cell 15.

The invention claimed is:

1. Vacuum measuring cell with a membrane (2, 41) disposed between two planar housing parts (1, 4), wherein the first housing part (1) forms a reference vacuum volume (10) and the second housing part (4) a measuring vacuum volume (9) with connection means (5) for the connection with the medium to be measured, and means for measuring the membrane deflection are provided, characterized in that the membrane surface (41*a*), which is exposed to the medium to be measured, is implemented as a structured surface, the structure of the structured surface being implemented such that an accumulation layer (40) deposited from the medium onto the membrane (2, 41) behaves substantially stress-free with respect to the membrane, such that hereby a stress deformation of the membrane (2, 41) is reduced.

2. Measuring cell as claimed in claim 1, characterized in that the membrane (2, 41) is substantially of ceramics, such as $Al_2O_3$, and/or of sapphire, such as monocrystalline $Al_2O_3$.

3. Measuring cell as claimed in claim 1, characterized in that the vacuum measuring cell forms with the membrane (2, 41) a capacitive and/or an optical measuring arrangement.

4. Measuring cell as claimed in claim 1, characterized in that the thickness of the membrane is in the range of 40 μm to 760 μm and the diameter is in the range of 5 to 80 mm.

5. Measuring cell as claimed in claim 1, characterized in that the structured surface of the membrane (2, 41) is implemented as a grid-form netted surface.

6. Measuring cell as claimed in claim 1, characterized in that the structure is worked into the membrane material.

7. Measuring cell as claimed in claim 1, characterized in that onto the membrane surface (41*a*) at least one layer is deposited which is structured, and that the layer material is comprised of $Al_2O_3$ and/or sapphire.

8. Measuring cell as claimed in claim 1, characterized in that the structure has steps (42).

9. Measuring cell as claimed in claim 1, characterized in that the structure comprises table-form elements (44), disposed interleaved with at least a second plane with table-form elements (44) such that a labyrinth-like shielding structure is provided.

10. Measuring cell as claimed in claim 1, characterized in that the thickness of the structure is in the range of 0.1 μm to 20 μm.

11. Measuring cell as claimed in claim 1, characterized in that between the connection means (5) of the measuring vacuum volume (9) and the medium to be measured a baffle arrangement (25) is disposed.

* * * * *